(12) United States Patent
Bennetts et al.

(10) Patent No.: US 7,404,146 B2
(45) Date of Patent: Jul. 22, 2008

(54) INPUT DEVICE FOR PORTABLE HANDSET

(75) Inventors: David James Bennetts, Battle (GB); Lawrence Allen Rigge, Emmaus, PA (US); Paul Robert Smith, Hampshire (GB); Richard Verney, Woking (GB)

(73) Assignee: Agere Systems Inc., Allentown, PA (US)

( * ) Notice: Subject to any disclaimer, the term of this patent is extended or adjusted under 35 U.S.C. 154(b) by 687 days.

(21) Appl. No.: 10/855,458

(22) Filed: May 27, 2004

(65) Prior Publication Data

US 2005/0268251 A1    Dec. 1, 2005

(51) Int. Cl.
  *G06F 3/00*   (2006.01)
  *G06F 3/048*  (2006.01)
  *A63B 57/00*  (2006.01)
  *A63B 69/36*  (2006.01)

(52) U.S. Cl. .................. 715/762; 715/834; 473/221
(58) Field of Classification Search ............ 715/786, 715/834; 473/221
  See application file for complete search history.

(56) References Cited

U.S. PATENT DOCUMENTS

| | | | | |
|---|---|---|---|---|
| 3,723,675 A | * | 3/1973 | Richey | 200/38 R |
| 5,327,161 A | * | 7/1994 | Logan et al. | 345/157 |
| 5,625,606 A | * | 4/1997 | Openiano | 368/10 |
| 5,871,406 A | * | 2/1999 | Worrell | 473/221 |
| 6,181,339 B1 | * | 1/2001 | deCarmo et al. | 715/835 |
| 6,392,963 B1 | * | 5/2002 | McGinnis-Smith et al. | 368/107 |
| 6,556,222 B1 | * | 4/2003 | Narayanaswami | 715/786 |
| 7,181,701 B2 | * | 2/2007 | Howard et al. | 715/854 |

OTHER PUBLICATIONS

Mechanical dymo tape label printing machine that was publicly available before the filing date of the present application.

Diver's watch with timer that was publicly available before the filing date of the present application.

* cited by examiner

*Primary Examiner*—Doug Hutton
*Assistant Examiner*—Soumya Dasgupta

(57) ABSTRACT

There is disclosed an input device including a display for displaying a plurality of icons, and a selector for selecting a displayed icon. At least a portion of the display is an electronic display. The device is adapted such that the selector moves relative to the display between a plurality of positions. At least one position corresponds to a displayed icon. The device further includes a function selection means. A function associated with an icon corresponding to a current position of the selector is selected when the function selection means is enabled.

17 Claims, 3 Drawing Sheets

INPUT DEVICE FOR PORTABLE HANDSET

BACKGROUND TO THE INVENTION

1. Field of the Invention

The present invention relates to an input device suitable for a portable handset, and particularly, but not exclusively, to an input device for a mobile telephone.

2. Description of the Related Art

Mobile telephone technology has evolved to a stage where the size of handsets is limited, in some instances, by the size of the user interface. The user interface can be generally considered to comprise an input device and a display, although the functionality of the input device and the display may be combined.

The input device typically comprises a keypad, which provides keys for entering numbers to facilitate the making of telephone calls, and keys for enabling functions to be selected, such as a function to start a call or end a call for example. A typical mobile telephone keypad may have seventeen keys.

In applications where it is desirable to minimize the size of the mobile telephone, the need to provide a usable input device for the mobile telephone may limit the reduction of the size of the telephone. In very small scale applications, it may not be possible to provide sufficient space for the input device.

Various techniques have been used in the art of mobile telephony to attempt to solve the problems associated with the need to provide the input device. It is known to provide the input device as a keypad comprising an array of very small keys or buttons. However beyond a certain size reduction, such keypads become difficult to use, and it may be difficult to select the depression of an individual key. It has also been known to provide keypads comprising unconventional arrays of keys in combination with the keys themselves being small. However such unconventional arrays of keys can be aesthetically unpleasing, and can also be awkward to use. It has also been proposed to provide voice recognition means as the input device for mobile telephones, and thereby eliminate the need for a keypad or require a keypad with a reduced number of keys. However voice recognition can be unreliable, and requires training. Voice recognition may also often be impractical to use, for example when it is desired to send a text message, such as a short messaging service (SMS) message, during a meeting. Another attempt to provide a reduced size input device on a mobile telephone or a portable device generally has been to provide a touch-pad with a stylus, functioning as a combined input device and display. A touch-pad is limited in use when miniaturised, however, and additional space is also needed to store a stylus. Thus the provision of a touch-pad in itself creates further size problems.

SUMMARY OF THE INVENTION

It is an aim of the present invention to provide an improved input device suitable for use with a mobile telephone.

In an embodiment, the invention provides an input device including a display for displaying a plurality of icons, and a selector for selecting a displayed icon, at least a portion of the display being an electronic display, the device being adapted such that the selector moves relative to the display between a plurality of positions, at least one position corresponding to a displayed icon, and the device further including a function selection means, wherein a function associated with an icon corresponding to a current position of the selector is selected when the function selection means is enabled.

Thus advantageously a small sized input device may be provided as a user input device for varied apparatus, including portable apparatus.

The selector is preferably a bezel. Force applied to the bezel may be used to determine selection of a displayed icon.

The display may be a permanent display. A portion of the display may be a permanent display.

The displayed icon is preferably displayed on the portion of the display. The portion of the display may be an electronic display. Alternately, the entire display may be an electronic display. Preferably, where a plurality of displayed icons are provided, all such icons are displayed on an electronic display.

The display is preferably displayed when the input device is switched on. The display may be switchable between a plurality of modes of display, each mode for displaying a set of one or more icons. The icons in each mode of display are preferably different. The icons in each mode of display may include one or more of a numerical character, or an alphabetical character, or a punctuation character; or a graphical icon.

Thus, advantageously, a single display and selector having a limited display size and a limited number of selector positions may be used to select a large number of icons, larger than may be selected in a single display arrangement. The size of the input device may thus be reduced still further.

The display may be adapted to display a plurality of sets of icons. The plurality of sets may be displayed simultaneously. The device then preferably includes a selector for selecting one of the plurality of sets of icons. In an embodiment where the display is a circular display, the plurality of sets of icons may comprise a plurality of icons displayed in a plurality of concentric ring configurations. A selector may then select one of the concentric rings. A single selector may be adapted for selecting a set of icons and for selecting a displayed icon from said set of icons.

Thus, advantageously, a large number of icons may be displayed without having to switch between display screens, thus speeding up use of operation of the input device.

The display and the selector are preferably positioned adjacent each other. The selector is preferably a rotating bezel adapted or configured to rotate relative to the display. The rotating bezel is preferably positioned around the display. The display and the selector may be circular shaped.

Thus advantageously the input device may be used single-handedly.

The selector may further comprise a marker, the marker indicating a current position of the selector. The marker may be provided on the selector. The marker may be displayed on said display. The marker may be a cursor on the display. The marker may highlight an icon displayed on the display. Preferably all the displayed icons are provided on the electronic display, and the marker is a cursor on the electronic display that indicates the icon associated with a current position of the selector.

The function selection means may comprise at least one button. The function selection means may be enabled by depression of said button. The function selection means may be mounted on a housing of the input device. The function selection means may be connected to the housing of the input device by an electrical wire. The wire may be retractable within the housing of the input device. The housing may be a wrist-mounted housing.

In an embodiment of the invention, there is provided a mobile handset including an input device as described. The mobile handset may be a telephone handset. The telephone handset may be a wrist-mounted mobile telephone handset.

In an embodiment of the invention, a display preferably displays alphabetical characters in which the characters R O T E A N I are displayed in consecutive sequence. In an embodiment of the invention a display preferably displays alphabetical characters in which the characters H C W B D S are displayed in consecutive sequence. In an embodiment of the invention a display preferably displays alphabetical characters in which the characters L Y U M G P F are displayed in consecutive sequence. In an embodiment of the invention a display preferably displays alphabetical characters in which the characters V X Q Z J K are displayed in consecutive sequence. Such sequences of characters are preferably presented in an arc on a display, corresponding to adjacent positions of the selector.

Thus advantageously commonly used characters are grouped in a fashion such that minimum movement of the selector is required for common words.

In general, the invention, and embodiments thereof, utilise a bezel to enable selection of functions associated with displayed icons on a display associated with the bezel.

BRIEF DESCRIPTION OF THE ACCOMPANYING DRAWINGS

The invention is described herein by way of reference to particular non-limiting examples as shown in the accompanying drawings, in which.

DESCRIPTION OF THE PREFERRED EMBODIMENTS

The invention is described herein by way of reference to the application of an input device in particular example scenarios. Specifically, the input device is described in the context of an application to a mobile telephone. The invention, however, is not limited in its applicability to such mobile telephones, and is more generally applicable as an input device for other types of portable and non-portable apparatus. The more general utility of the invention is discussed further hereinafter.

Figure 1A:
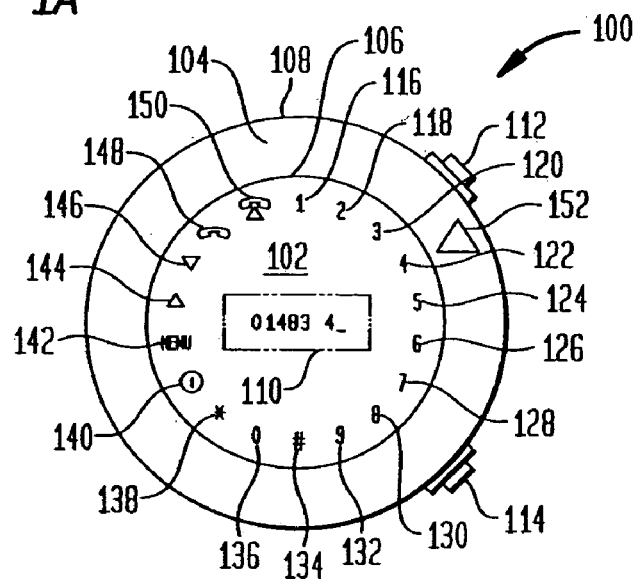
FIGS. 1a to 1c illustrate an input device in accordance with one embodiment of the invention.
Figure 1B:
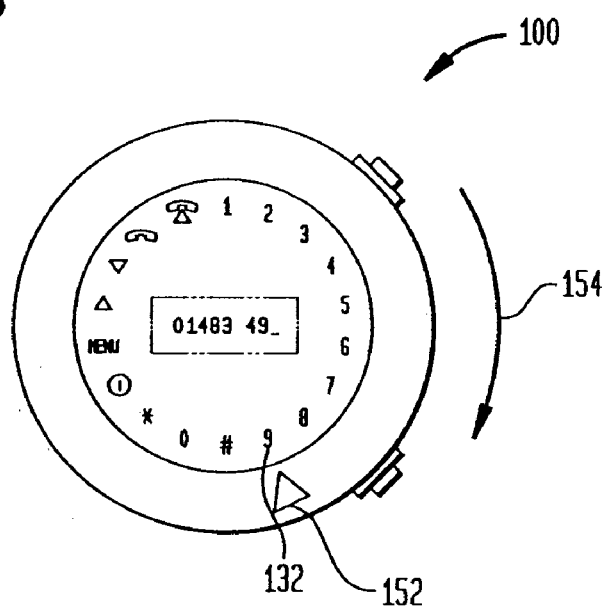
Figure 1C:
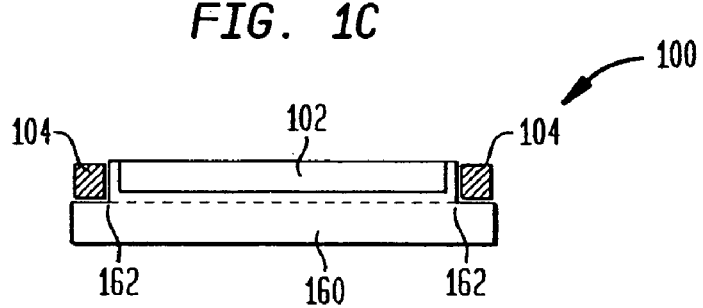

Referring to FIGS. 1a to 1c, there is illustrated an input device in accordance with a first embodiment of the invention.

Referring to 1a, there is generally illustrated a circularly shaped display denoted by reference numeral 102, with a circular rotating bezel 104 positioned around the outer circumference thereof. The outer circumference of the display denoted by reference numeral 106 is shown as being directly adjacent to the bezel 104. In practice, sufficient space is provided between the circumference of the display 106 and the bezel 104 to allow the bezel 104 to rotate about the circular display 102. Reference 108 denotes the circumference of the rotating bezel.

From FIG. 1a, it may be seen that the input device comprises simply a display disposed within a rotating bezel. However, the display and/or the rotating bezel are preferably provided on a housing of a device with which they are associated. Referring to FIG. 1c, a housing is generally denoted by reference numeral 160. As can be seen, the housing is provided with a stepped edge which provides a shoulder 162 around the circumference of the housing. The stepped edge provides for the bezel 104 to be located at the top of the housing. As denoted further in FIG. 1c, the display 102 may be fitted into the surface of the housing, within the area encircled by the bezel. It is not necessary for the display 102 to be directly adjacent to the bezel 104. As will become understood in the following description, it is merely necessary for the bezel to be able to indicate or point to a location on the display.

The specific mounting of the display and the associated bezel is not part of the invention, and will depend upon the device with which the display and bezel are being used in any given application.

The display 102 may comprise a plurality of different formats, and the invention is not limited to any particular format of the display. For example, the entire display 102 may be an electronic display, such as LCD, with various icons being displayed thereon when the input device is switched on or powered-up. Alternatively, the display 102 may have a permanent display of icons, with an electronic display provided only in a part thereof. For example, referring to FIG. 1a, the dashed box 110 may be an electronic display, and the remainder of the display 102 may be a permanent display, with various icons permanently marked thereon.

Referring again to FIG. 1a, the display 102 is provided with a plurality of icons. These icons are icons which are typically provided on keys of a keypad of a mobile telephone. Thus, for example, the display is provided with icons showing numeric characters 1 to 9, as denoted by reference numerals 116 to 132 respectively. In addition, the display shows a hash character 134, a zero character 136, a star character 138, a character associated with an on/off function 140, a menu character 142, a character associated with scrolling up a menu 144, a character associated with scrolling down a menu 146, a character associated with the initiation of a telephone call 148, and a character associated with the termination of a telephone call 150. These are all icons which may, in a mobile telephone having a keypad-type input device, be provided on the keys of the keypad to indicate the function of such keys.

As further illustrated in FIG. 1a, the housing on which the input device, generally designated by reference numeral 100, is mounted is further provided with two buttons 112 and 114. The buttons may provide for various functions associated with the operation of the mobile telephone outside the scope of the invention. For example, the buttons may provide for the illumination of the display 102. Alternatively the buttons may provide for, for example, shortcuts to common functions, such as call answering and call termination.

In accordance with a preferred embodiment of the invention, one of the buttons 112 or 114 is provided with the functionality of a character or function selection in accordance with the operation of the rotating bezel 104, as described further hereinafter.

The rotating bezel 104, as illustrated in FIG. 1a, is provided with a marker 152. The marker 152 may take various forms, and may be a character marked on the bezel, such as an arrow, or a groove on the bezel. The rotating bezel 104 is movable around the outer circumference of the display 102 between a plurality of positions. Each of the plurality of positions is associated with an icon displayed on the display 102. For example, if the display 102 always displays the icons as shown in FIG. 1a, the rotating bezel 104 is rotatable about a plurality of positions corresponding in number to the number of icons 116 to 150. Thus the rotating bezel 104 is preferably rotatable about a plurality of positions corresponding to a plurality of icons displayed, or capable of being displayed, on the display 102.

Thus, in any given position, the marker 152 of the rotating bezel points to or aligns with, either accurately or approximately, a displayed icon. When the marker 152 is so aligned with a displayed icon, the one of the buttons 112 and 114 which is associated with the operation of the bezel may be depressed, to select the function associated with the icon. Thus, for example, in FIG. 1a there is shown an example where a user is entering a telephone number for calling. By aligning the marker 152 on the rotatable bezel with the icon 122, which denotes the numeric character 4, and depressing the appropriate function selection button 112 or 114, the numeric character 4 appears on the display 102, in a particular example, within the electronic display 110.

Thereafter, the rotating bezel 104 is rotated in a clockwise direction such that the marker 152 aligns with the icon 132 which denotes the numeric character 9. Again the appropriate one of the selection buttons 112 and 114 is depressed, and the numeric character 9 appears within the electronic display 110 of the display 102.

In this way, it can be seen that the rotating bezel can be used to enter a telephone number. Once the telephone number has been completely entered, the bezel may be rotated such that the marker 152 aligns with the icon 148 and, on depression of the appropriate selection button 112 or 114, a telephone call is made.

In this way, functions associated with all of the displayed icons may be selected by the rotating bezel. It should be noted that some of the icons denote specific functions, such as the initiation or termination of a telephone call, or the display of a menu. Other icons relate to a function which is simply the displaying on the display of a character associated with the icon, such as the numeric characters.

Figure 2A:
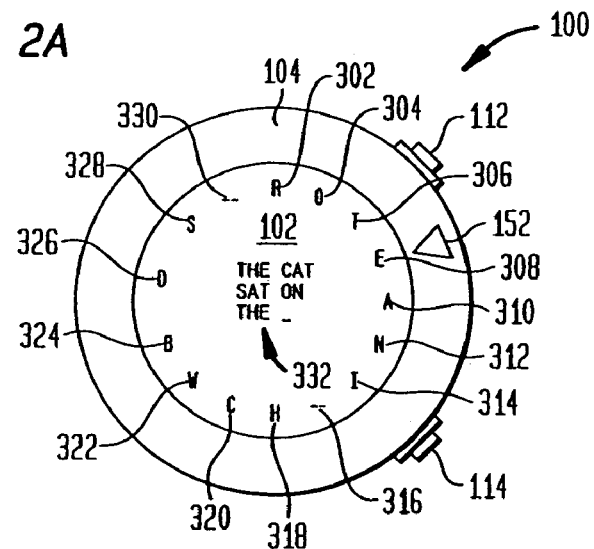
FIGS. 2a to 2c illustrate an input device in accordance with further embodiments of the invention.
Figure 2B:
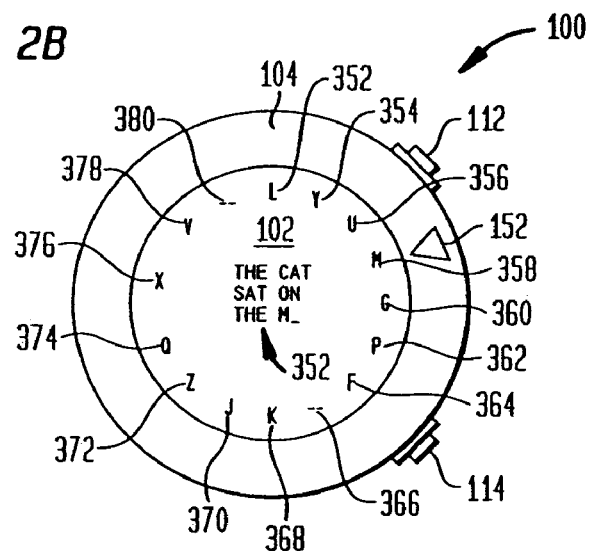

The example embodiment described hereinabove with reference to FIGS. 1a to 1c illustrates the input device in accordance with the principles of the invention used to replace a basic keypad of a mobile telephone. Referring to FIGS. 2a and 2b, there is illustrated the application of the principles of the invention as a more efficient method for text entry compared to a mobile telephone keypad layout.

Referring to FIG. 2a, the display 102 displays a plurality of alphabetical characters. Thus the display displays, starting from the "12 o'clock" position and moving in a clockwise direction, the alphabetical characters R, O, T, E, A, N, I, space character, H, C, W, B, D, S, space character, respectively denoted by reference numerals 302 to 330. As such, by rotating the bezel 104 about the display, and selecting an alphabetical character with which the pointer 152 of the bezel 104 aligns, the alphabetical character appears on the display 102, as denoted by reference numeral 332. It should be noted that the alphabetical characters displayed on the display 102 and for selection by the bezel are icons representing the alphabetical characters. Their associated function, when selected, is simply to display such alphabetical character on the display.

In FIG. 2a, two space characters are provided due to the prevalence of the space character in text strings. The grouping of the alphabetical characters is based upon the most commonly used characters. Thus, the characters "R O T E A N I" appear consecutively on the display 102 of FIG. 2a.

Referring to FIG. 2b, there is illustrated a display of further alphabetical characters again for, advantageously, text messaging purposes. Preferably, the display 102 is an entirely electronic display, and by depression of one of the selection buttons 112 or 114, the display moves from the display presentation of FIG. 2a to the display presentation of FIG. 2b. In FIG. 2b, alternative alphabetical characters are presented. Again, starting from the "12 o'clock" position and moving in a clockwise direction, the alphabetical characters displayed are L, Y, U, M, G, P, F, space character, K, J, Z, Q, X, V, space character, each denoted by respective reference numerals 352 to 380. As shown in FIG. 2b, the rotating bezel marker 152 is aligned with the icon associated with the alphabetical character M, and the selection button 112 or 114 is depressed such that the character M appears on the display 352.

The display 102 may be scrolled through a number of different displays, displaying a different set of characters and/or numbers and/or further characters such as punctuation marks. In this way, an efficient text messaging functionality is provided. The display may also be used in this way in order to enter details such as contact details into the memory of the mobile telephone. Rotation of the rotating bezel 104 is minimized by placing the most commonly used letters, pairs of letters, and first letters of words together. Combined with predictive text, this system leads to an efficient word entry scheme. For predictive text, at each location of the bezel 104, there may be provided three alphabetical characters. The three alphabetical characters are then selected, as known in predictive text input, to provide a rapid technique for inputting words.

In a preferred embodiment, one of the side buttons 112 and 114 is used to select the icon with which the bezel marker 152 is aligned, and the other of the buttons is used to change the display mode, i.e. scroll between display screens.

Figure 2C:
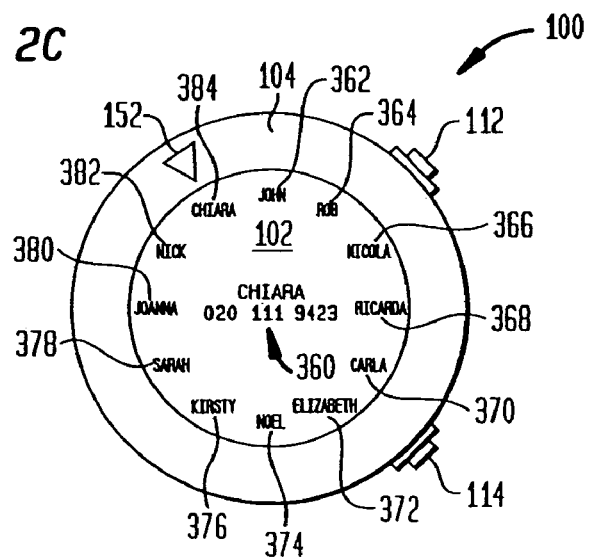

Referring to FIG. 2c, a further example of a display 102 is illustrated. This example may be considered to be a "phone a friend" function. The display displays a number of names, which may for example be a first set of names retrieved from a directory within the mobile telephone, or the most common names telephoned. In FIG. 2c, there is displayed twelve names, denoted by reference numerals 362 to 384. The rotating bezel 104 is once again rotated about the display such that the marker 152 aligns with a particular name. Depression of the appropriate selection button 112 or 114 then initiates a telephone call to the named person. For example in FIG. 2c, the marker 152 aligns with a name denoted by the icon 384, and the name and associated telephone number are displayed on the display, as denoted by reference numeral 360.

Further modifications to the examples shown with reference to FIGS. 1 and 2 can be envisaged. For example, with reference to FIG. 2c, rather than display a list of names as icons, a set of photographs of contacts can be displayed. The invention is not limited in any respect in terms of the type of icons that may be displayed, or the association of such icons with any information stored in the apparatus with which the input device is associated or any functions of the apparatus.

The invention is not limited to any particular display format or set of displays formats. The content displayed at any instant is implementation dependent, and in certain implementations, a permanent fixed display may be provided, or a changeable display changeable between a plurality of different displays of different content and style may be provided. The changeable display is preferably an electronic display for displaying one or more selections of icons. In a preferred embodiment, the number of icons displayed on a display, and therefore the number of functions selectable from a display, corresponds to the number of positions about which the selector (e.g. the rotating bezel) is moveable. The number of icons displayed on a display at any instant may be less than the number of positions about which the selector is moveable.

In an embodiment, the display may comprise a plurality of rings of icons presented in concentric circles. In this way, the rotating bezel, or more generally the selector, may align with an icon in each ring or concentric circle in each selector position. The individual icon to be selected may then be selected by depression of an appropriate function key. For example, referring to FIGS. 1 and 2 the display may be provided with two concentric rings of icons, and one of the buttons 112 and 114 may be associated with the inner ring and the other of the buttons 112 and 114 associated with the outer ring. Further modifications to this may, for example, enable more than two rings of icons to be selected based on the provision of more than one function selection button, or by using the function selection buttons in some combined way. For example two function selection buttons may be used to select one of three rings: one button for a first ring, a second button for the second ring, and both buttons simultaneously for the third ring.

In a still further adaptation, it is envisaged that more than one selector ring may be provided, the plurality of selector rings being associated with a corresponding plurality of rings of icons. Thus one ring of icons may represent alpha-numeric characters, and be associated with a first selector, and a second ring of icons may represent operational functions, and be associated with the second selector. In a further modification, the first selector may be associated with a plurality of concentric rings of displayed icons, and the second selector may select the one of the rings for use.

Figure 3:
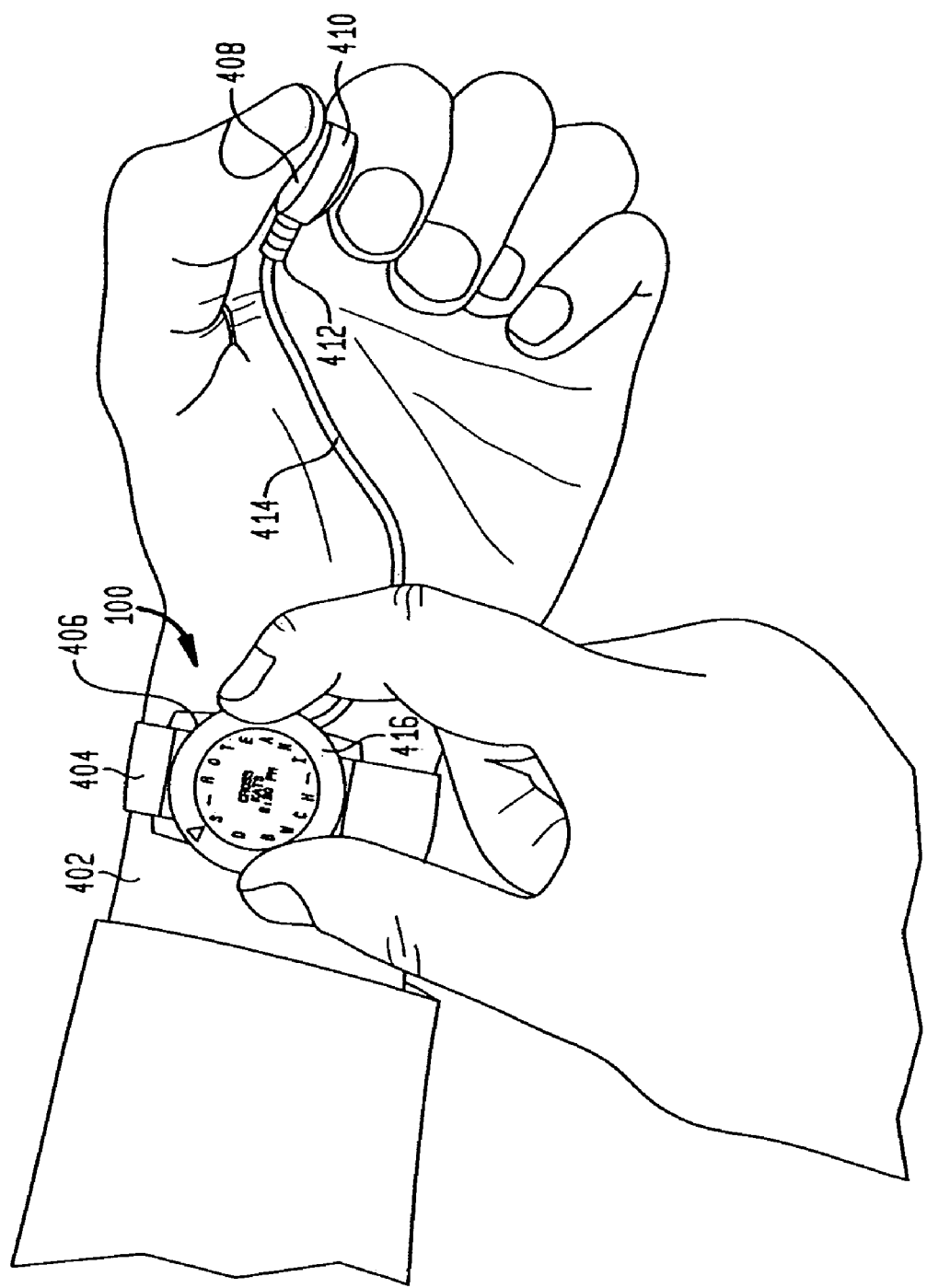
FIG. 3 illustrates the use of an input device in accordance with embodiments of the invention in a wrist-mounted application.

The invention has particular advantage when used as an input device for a wrist-mounted mobile telephone. This is illustrated with reference to FIG. 3. The input device generally designated by reference numeral 100 is provided as an input device for a mobile telephone 406, which is attached to a wrist strap 404. The wrist strap 404 is attached, in a conventional manner, to a wrist 402 of a user. In a preferred embodiment, the selector for selecting a function with which the bezel marker is aligned is provided on a retractable cord connected to the wrist device. Thus, as illustrated in FIG. 3, a cord 414 extends from a point 416 of the mobile telephone 406. At the other end of the cord 414 to the mobile telephone 406 there is provided a button housing 410 including a button 408. The cord 414 is preferably provided with a sufficient length that the button housing 410 can be gripped between the fingers of the hand of the user on which the associated wrist has the mobile telephone fixed thereto. Thus, as illustrated in FIG. 3, the user can use one hand to rotate the bezel, and the other hand to select a function. The function is selected by depression of the button 408. The cord 414 between the button housing 410 and the mobile telephone 406 is thus an electrical cord, which is preferably retractable, preferably automatically, within the mobile telephone housing 406 when not in use.

The use of the input device in accordance with embodiments of the invention is not limited to a wrist-mounted mobile telephone. It may also be used in combination with other types of mobile telephone. For example, the input device may be mounted on a larger mobile telephone handset. Such a mobile telephone handset may have a further display, being a large display, for displaying images such as images retrieved from the internet. However the input device of the present invention may still be advantageously used to minimise the need for a large keypad in addition to a large display.

The use of the input device in accordance with embodiments of the invention is not limited to a mobile telephone handset which is circular in shape. The input device may be mounted onto a mobile telephone handset which is of a shape different to the input device itself.

Further, the input device in accordance with embodiments of the invention is not limited to itself being circular in shape. Any shape of the display may be possible, and an appropriately adapted bezel or selector may therefore be provided. For example, the display may be of a rectangular shape, with icons displayed on one or more sides of such display. A selector may then be provided by a sliding marker means on one or more sides of the display such as a bezel adapted to slide along a line. Even where the display is not circular, multiple sets of icons may be displayed, as in the example discussed above with reference to icons displayed as rings of concentric circles, with a selection button for example selecting one of the sets, and the selector selecting the icon within the set.

Whilst the embodiments of the invention are described herein with reference to a rotating bezel, more generally a displayed icon is selected by use of a moveable selector. Whilst in preferred embodiments, the moveable selector is a rotating bezel, it may alternatively be a sliding bezel, with the marker moving along the side of one or more sides of the display. As discussed, in general the bezel may be considered to be a selector, for selecting a displayed icon. The selector may be implemented in any suitable way for operating in conjunction with a particular display shape. The invention is not limited to the use of a bezel. Any movable selector which can move relative to the display, or any fixed selector which can be used in combination with a movable display, is possible. For example, the circular bezel 104 shown in the figures may be replaced by a radial bar, the end of which forms the marker 152. The bar may then be rotatable about the central axis of the display.

In the preferred embodiments, the selection of an icon is achieved by rotation of a bezel, which more generally can be considered to be the movement of a selector, between a number of positions, each position being associated with a displayed icon. In an embodiment, movement of the bezel between positions may be translated to movement of a cursor displayed on the screen. The cursor may be a distinct cursor displayed on the display alongside the icon to which the cursor currently points, or the cursor may take the form of highlighting a currently associated icon. Such a cursor would thus replace the marker 152 on a selector which is moveable relative to the display.

The invention is furthermore not limited to applications where the display is fixed and the bezel rotates. Alternatively, the bezel may be fixed and the display may rotate. Alternatively, both of the display and the bezel may rotate, either to a limited or full extent. Similarly, the input device in accordance with the invention is not limited to an arrangement in which the bezel is provided around the perimeter of the display. Alternatively the display may be provided around the outer perimeter of the bezel. The display and bezel simply need to be provided in a proximate adjacent manner, such that a marker associated with the bezel can be clearly associated with an icon displayed on the display.

The display is also not limited to any particular format. The display may be an electronic display, or may be a non-electronic display on which icons are permanently marked. The display may be a combination of electronic display and a permanently marked display.

The invention, as an input device, is also not limited in its applicability to use as an input device for a mobile telephone. Generally, the input device may be used as an input device for any apparatus.

The input device of the invention may be used as an input device for fixed apparatus, such as wall-mounted apparatus, or apparatus found in vehicles. A wide range of applications are possible, such as medical apparatus, electric locks, etc.

It is envisaged that the invention will find significant utility in applicability to handheld devices. The input device of the invention may be used, for example, not only as an input device for a mobile telephone as described herein, but in other handheld applications. For example, the input device may be used as an input device of a personal data assistant.

Various modifications and adaptations to the invention as described herein, and alternative applications in implementations, will be apparent to one skilled in the art. The protection afforded by the invention is defined by the appended claims.

What is claimed is:

1. An input device including a display for simultaneously displaying a plurality of sets of icons, each set of icons comprising a plurality of icons, a first selector for selecting one of the plurality of sets of icons and thereby activating the selected set for further selection of individual icons within the selected set, and a second selector for selecting one of the icons in the selected set of icons, at least a portion of the display being an electronic display, the device being adapted such that the first or second selector moves between a plurality of positions relative to the display, at least one of the positions corresponding to one of the displayed icons, and the device further including a third selector, wherein, when the third selector is enabled, a function associated with the selected icon is activated.

2. An input device according to claim 1 wherein the displayed icons are displayed on said electronic portion of said display.

3. An input device according to claim 1 wherein the first or second selector that moves between a plurality of positions relative to the display is a rotating bezel adapted to rotate relative to the display.

4. A mobile telephone comprising the input device of claim 3.

5. An input device according to claim 1 wherein the input device further comprises a marker, the marker indicating a current position of the first or second selector that moves between a plurality of positions relative to the display.

6. An input device according to claim 5 wherein the marker is displayed on said display.

7. An input device according to claim 1 wherein the first or second selector that moves between a plurality of positions relative to the display comprises a marker, the said selector selecting the icon, is closest to the marker.

8. An input device according to claim 1, wherein the first or second selector that moves between a plurality of positions relative to the display is fixedly mounted on a housing of the input device.

9. An input device according to claim 1 wherein the display further comprises a permanent display portion and wherein the displayed icons are displayed on the permanent display portion.

10. An input device according to claim 1 wherein said third selector controls said display upon operation of said third selector so as to cause said display to switch between displaying different ones of said sets of icons.

11. A mobile telephone comprising the input device of claim 10.

12. A mobile telephone comprising the input device of claim 1.

13. An input device including a display for simultaneously displaying a plurality of sets of icons, each set of icons comprising a plurality of icons, a first selector for selecting one of the plurality of sets of icons and thereby activating the selected set for further selection of individual icons within the selected set, and a second selector for selecting one of the displayed icons in the selected set of icons, at least a portion of the display being an electronic display, the device being adapted such that the first or second selector moves between a plurality of positions relative to the display, at least one of the positions corresponding to one of the displayed icons, and the device further including a third selector, wherein, when the third selector is enabled, a function associated with the selected icon is activated, wherein the third selector comprises at least one button.

14. An input device including a display for simultaneously displaying a plurality of sets of icons, each set of icons comprising a plurality of icons, a first selector for selecting one of the plurality of sets of icons and thereby activating the selected set for further selection of individual icons within the selected set, and a second selector for selecting one of the displayed icons in the selected set of icons, at least a portion of the display being an electronic display, the device being adapted such that the first or second selector moves between a plurality of positions relative to the display, at least one of the positions corresponding to one of the displayed icons, and the device further including a third selector, wherein, when the third selector is enabled, a function associated with the selected icon is activated, wherein the third selector is connected to a housing of the input device by an electrical wire and wherein the third selector is movable relative to the housing.

15. A mobile telephone comprising the input device of claim 14.

16. An input device including a display for simultaneously displaying a plurality of sets of icons, each set of icons comprising a plurality of icons, a first selector for selecting one of the plurality of sets of icons and thereby activating the selected set for further selection of individual icons within the selected set, and a second selector for selecting one of the displayed icons in the selected set of icons, at least a portion of the display being an electronic display, the device being adapted such that the first or second selector moves between a plurality of positions relative to the display corresponding to the displayed icons, and the device further including a third selector, wherein, when the third selector is enabled, a function associated with the selected icon is activated, wherein the said selector is a sliding bezel adapted to slide along a line.

17. A mobile telephone according to claim 16 wherein said cellular telephone is adapted to be wrist mounted.

* * * * *